(12) United States Patent
Smed

(10) Patent No.: US 8,500,077 B2
(45) Date of Patent: Aug. 6, 2013

(54) TELESCOPING ASSEMBLY FOR A CPU HOLDER

(76) Inventor: Ole Falk Smed, Calgary (CA)

(*) Notice: Subject to any disclaimer, the term of this patent is extended or adjusted under 35 U.S.C. 154(b) by 259 days.

(21) Appl. No.: 12/910,635

(22) Filed: Oct. 22, 2010

(65) Prior Publication Data

US 2012/0097814 A1    Apr. 26, 2012

(51) Int. Cl.
*A47H 1/00* (2006.01)
*A47B 11/00* (2006.01)
*E04G 3/00* (2006.01)

(52) U.S. Cl.
USPC ........ 248/317; 248/285.1; 248/917; 108/140; 108/143

(58) Field of Classification Search
USPC .................. 248/317, 326, 333, 316.1, 298.1, 248/505, 225.11, 429, 224.8, 285.1, 917, 248/918; 108/137, 138, 139, 140, 143
See application file for complete search history.

(56) References Cited

U.S. PATENT DOCUMENTS

| | | | | |
|---|---|---|---|---|
| 4,079,604 | A | * | 3/1978 | Anderegg ................. 248/285.1 |
| 5,779,206 | A | * | 7/1998 | Harris et al. ................. 248/214 |
| 6,098,944 | A | * | 8/2000 | Pangborn et al. ............ 248/317 |
| 6,402,111 | B1 | * | 6/2002 | Stewart et al. ................ 248/317 |
| 6,409,127 | B1 | * | 6/2002 | VanderHeide et al. ....... 248/118 |
| 6,460,817 | B1 | | 10/2002 | Bosson |
| 6,969,792 | B2 | * | 11/2005 | Wang ............................ 84/177 |
| 6,986,411 | B2 | * | 1/2006 | Schautt et al. .............. 188/72.7 |
| 7,841,570 | B2 | * | 11/2010 | Mileos et al. ............ 248/281.11 |

* cited by examiner

*Primary Examiner* — Tan Le
(74) *Attorney, Agent, or Firm* — Carl A. Hjort, III

(57) ABSTRACT

A telescoping assembly for use with a CPU holder including a mounting track with mounting holes for securing the mounting track to the underside of a generally horizontal surface such as a desk; runners disposed in the mounting track; a telescoping track, adapted for insertion into the mounting track and to engage with the runners therein; a pivoting member, adapted for engagement with the telescoping track and to engage with a CPU holder, the pivoting member comprising a track engagement member and a CPU holder engagement member being joined for 360° rotation about a vertical axis therethrough; and wherein the telescoping track is adapted for translation along the mounting track from a retracted position to an extended position, and when the telescoping track is in the extended position a CPU retained in the CPU holder is positioned past the edge of the generally horizontal surface.

17 Claims, 6 Drawing Sheets

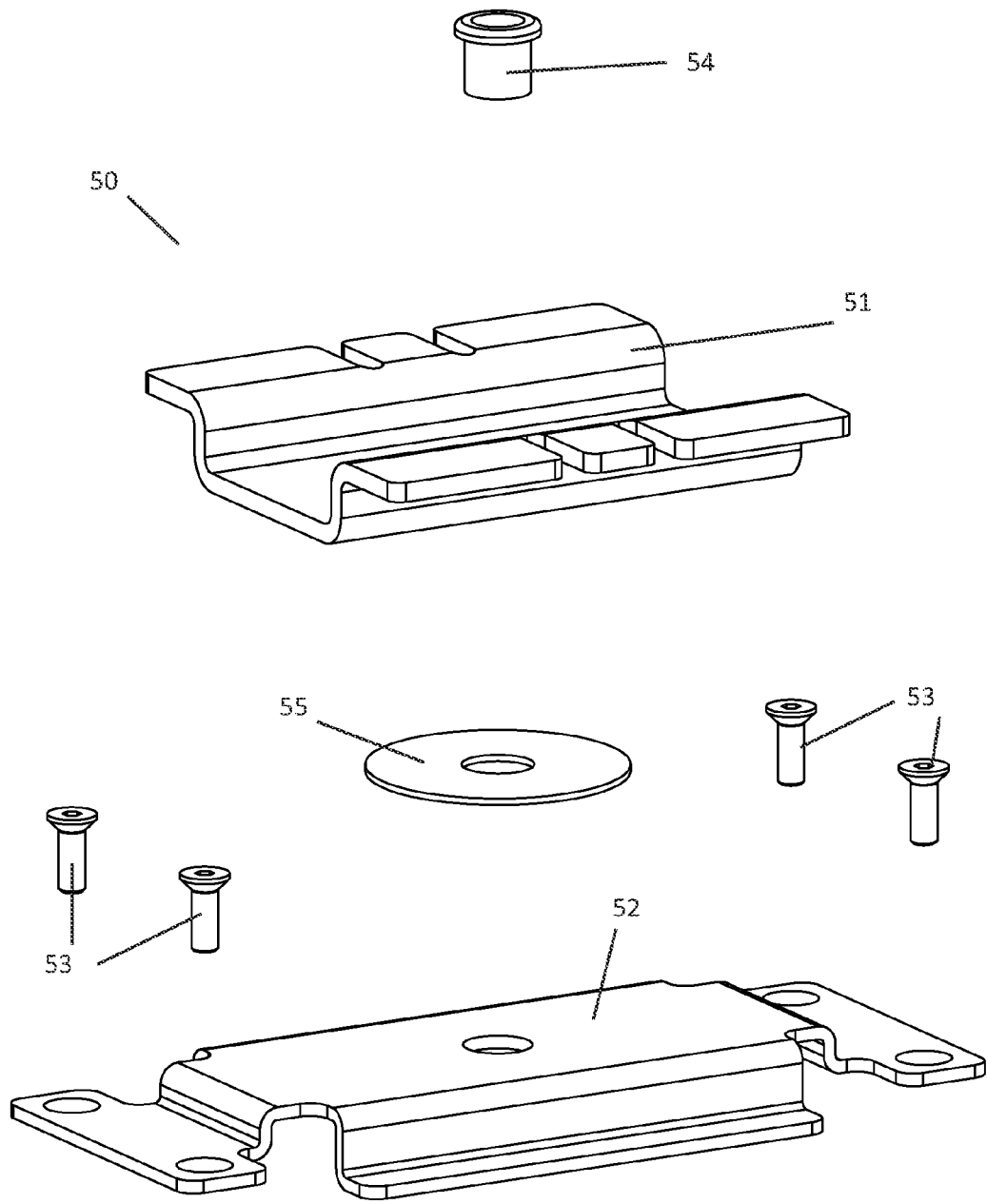

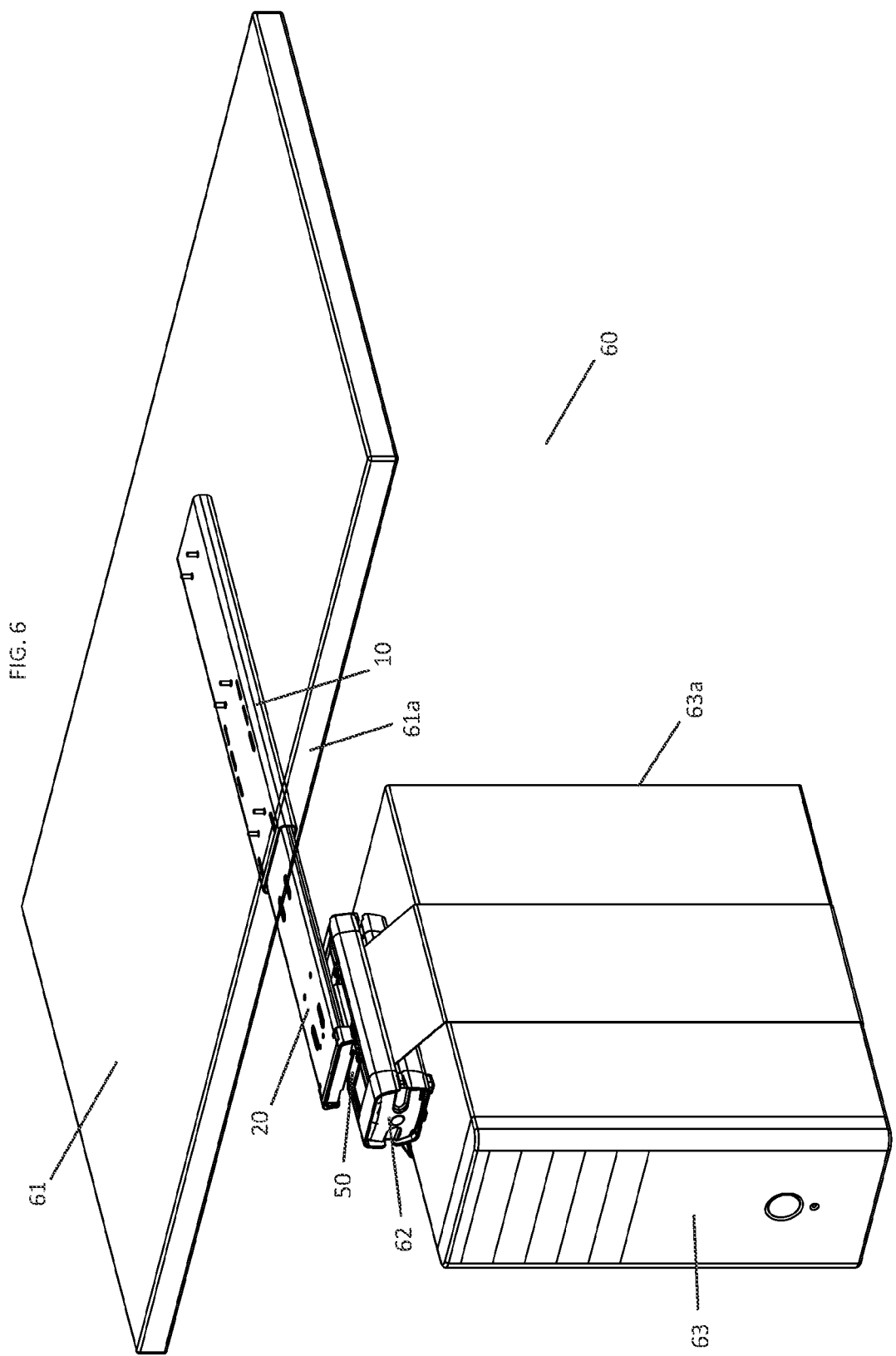

TELESCOPING ASSEMBLY FOR A CPU HOLDER

BRIEF DESCRIPTION OF THE DRAWINGS

FIG. 5 is an exploded view of a pivoting member for use with the telescoping assembly for a CPU holder.

FIG. 6 is a perspective view of the entire telescoping assembly for a CPU holder, showing a CPU disposed therein.

DETAILED DESCRIPTION OF THE DRAWINGS

Embodiments of a telescoping assembly for a CPU holder are shown and described. Generally, the telescoping assembly comprises a mounting track with mounting holes for securing the mounting track to the underside of a generally horizontal surface such as a desk; runners disposed in the mounting track; a telescoping track, adapted for insertion into the mounting track and to engage with the runners disposed therein; a pivoting member, made for engagement with the telescoping track and for engagement with a CPU holder, and capable of 360° rotation about a vertical axis therethrough; and further that the telescoping track is adapted for translation along the mounting track from a retracted position to an extended position, and when the telescoping track is in the extended position, the pivoting member and the CPU holder are in a position substantially past the edge of the desk surface, and a CPU retained in the CPU holder is positioned past the edge of the desk surface.

Figure 1:
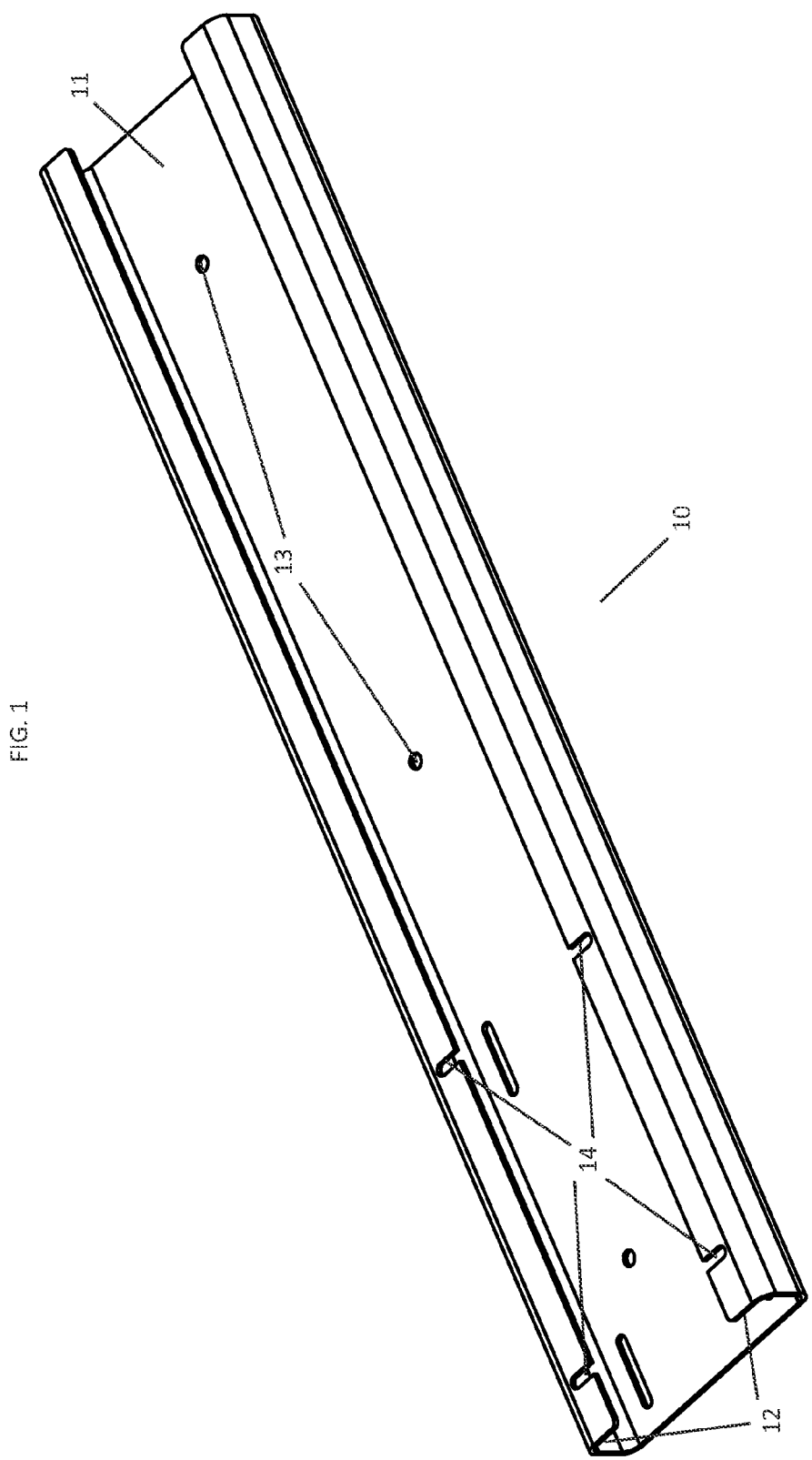
FIG. 1 is a perspective view of a mounting track for a telescoping assembly for a CPU holder.

FIG. 1 shows a perspective view of an embodiment of the mounting track 10 for a telescoping assembly for a CPU holder. Mounting track 10 is generally comprised of base member 11, and channel forming members 12. As illustrated in FIG. 1, mounting track 10 has a generally c-shaped cross-section. One of ordinary skill in the art will readily appreciate that mounting track 10 can be formed from a single piece of material, or could be formed from multiple pieces of material joined together in any manner commonly used in the art. Mounting track 10 can be made of steel, aluminum, other metals or plastics. It should also be appreciated that FIG. 1 shows the mounting track 10 from the bottom. That is, the opposite side of the illustrated base member surface 11 is mated with the underside of the desk or other generally flat surface to which mounting track 10 is to be mounted. In that way, channel forming members 12 hang down from the underside of the desk surface, and are capable of receiving the telescoping track, in a manner which will be discussed in greater detail infra. Also shown in FIG. 1 are mounting holes 13. Mounting holes 13 allow for the securing of mounting track 10 to the underside of a desk or other generally flat surface in the manner discussed above. One of ordinary skill in the art will appreciate that mounting holes 13 are sized to receive standard fasteners adequate for securing the telescoping assembly and CPU holder to the underside a desk or similar surface. FIG. 1 also shows runner engagement slots 14. As will be explained in greater detail with reference to the exploded view shown in FIG. 3, runner engagement slots 14 engage with and retain runners in the mounting track.

Figure 2:
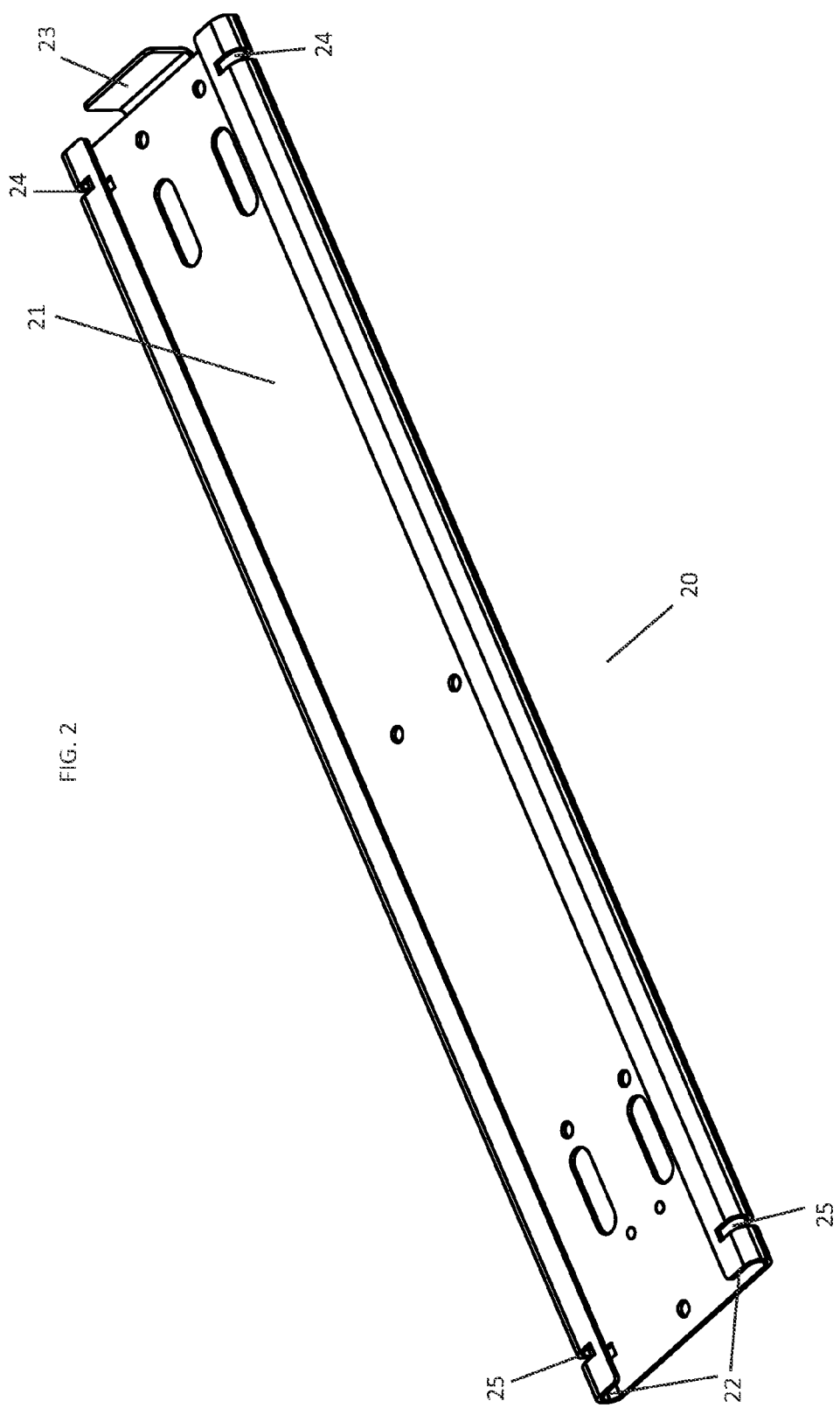
FIG. 2 is a perspective view of a telescoping track for a telescoping assembly for a CPU holder.

FIG. 2 shows a perspective view of an embodiment of the telescoping track 20 for a telescoping assembly for a CPU holder. Generally, telescoping track 20 has a similar shape to mounting track 10, however telescoping track 20 has smaller dimensions than mounting track 10, such that telescoping track 20 may be inserted into mounting track 10, and telescoping track 20 may translate along mounting track 10. Telescoping track 20 is generally comprised of flat base surface 21 and channel forming members 22. As illustrated in FIG. 2, telescoping track 20 has a generally c-shaped cross-section. One of ordinary skill in the art will readily appreciate that telescoping track 20 can be formed from a single piece of material, or could be formed from multiple pieces of material joined together in any manner commonly used in the art. Telescoping track 20 can be made of steel, aluminum, other metals or plastics. It should also be appreciated that FIG. 2 shows the telescoping track 20 from the bottom. That is, telescoping track 20 is inserted into the mounting track with the opposite side of illustrated base member surface 21 disposed upwardly. In that way, channel forming members 22 are disposed in a downward facing direction, and are capable of receiving the pivoting member, in a manner which will be discussed in greater detail infra. Also shown in FIG. 2 is stop member 23. Stop member 23 may be formed integral to telescoping track 20 or it may be formed separately and joined to telescoping track 20 by any method known in the art. Stop member 23 functions to prevent the pivot member from coming out of the tracks created by channel forming members 22. Telescoping track 20 also has runner retention slots 24 disposed thereon. Runner retention slots 24 allow for additional runners to be retained on the telescoping track. Telescoping track 20 also has end cap retention slots 25 disposed thereon. End cap retention slots 25 serve as engagement points for the end cap, which will be described more completely in relation to the exploded view in FIG. 3.

Figure 3:
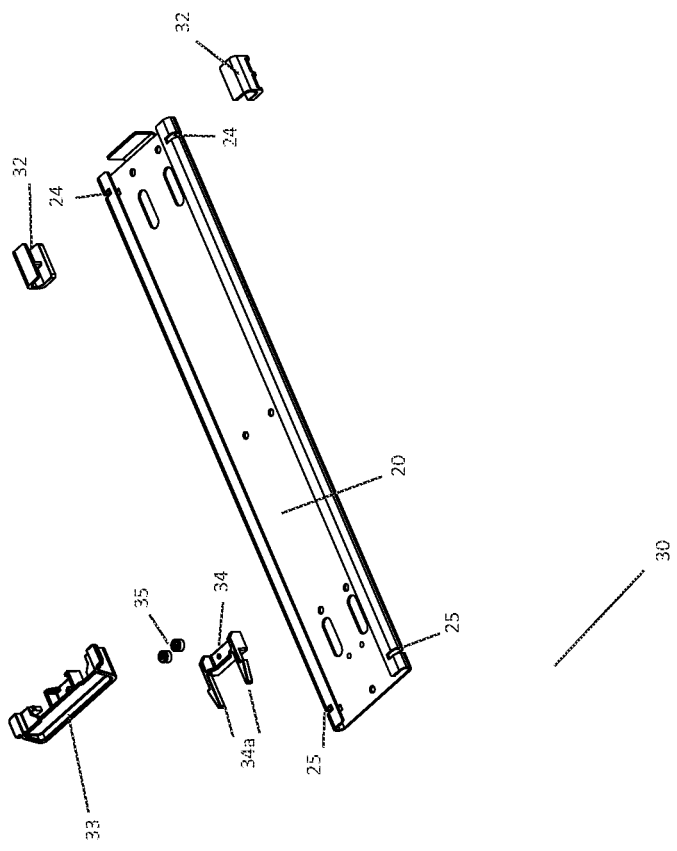
FIG. 3 is an exploded view showing the assembly of the mounting track and the telescoping track.
Figure 3:
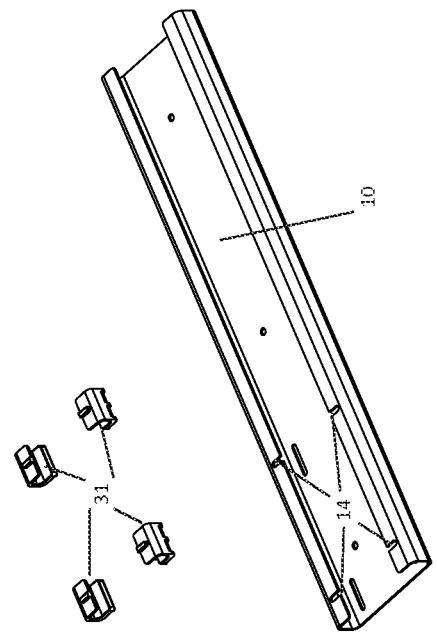

FIG. 3 shows an exploded view of the assembly 30 of the mounting track 10 and the telescoping track 20. The features of both the mounting track 10 and the telescoping track 20 are shown with numerals corresponding to the numerals used in relation to FIGS. 1 and 2. FIG. 3 shows additional components such as mounting track runners 31. Mounting track runners 31 are retained in runner engagement slots 14 on mounting track 10. Mounting track runners 31 facilitate the translation of the telescoping track within the mounting track by functioning as low-friction bearing surfaces for telescoping track 20. Also shown in FIG. 3 are telescoping track runners 32. Telescoping track runners 32 are retained in runner retention slots 24 on the telescoping track 20. Telescoping track runners 32 perform the same function as mounting track runners 31, i.e. they provide a low-friction bearing surface to facilitate the translation of telescoping track 20 along mounting track 10. Telescoping track runners 32 also perform the additional function of acting as a stop to prevent telescoping track 20 from being pulled entirely out of engagement with mounting track 10. If a user slides telescoping track 20 forward in relation to mounting track 10, telescoping track runners 32 will eventually make contact with mounting track runners 31 and further progress of the telescoping track in the forward direction will then be impeded. End cap 33 is also shown in FIG. 3. End cap 33 engages with end cap retention slots 25 on telescoping track 20. End cap 33 may be removable from the end of telescoping track 20. If a user desires to remove the pivoting member from telescoping track 20, which will be discussed in greater detail below, then end cap 33 must be removed from the end of telescoping track 20 to allow for the removal of the pivoting member. End cap 33 may also be fixed in place in alternate embodiments. Release member 34 is also shown in FIG. 3. Release member 34 is adapted to retain the pivoting member in engagement with the telescoping track. Release member 34 is also adapted to release the pivoting member from engagement with the telescoping track upon compression by a user. Release member 34 has flexible fingers 34a, which in their uncompressed state obstruct pivoting member from being able to slide out of engagement with telescoping track 20. Flexible fingers 34a may be compressed by a user to allow the pivoting member to slide out of engagement with telescoping track 20. Thus, to remove the pivoting member from the telescoping track, a user first removes the end cap 33 from engagement with the telescoping track 20, then compresses the release member 34 and slides the pivoting member out from engagement with the telescoping track 20. Release member 34 may be secured to telescoping track 20 by way of screws 35 or any other fastener or method of fastening known in the art.

Figure 4:
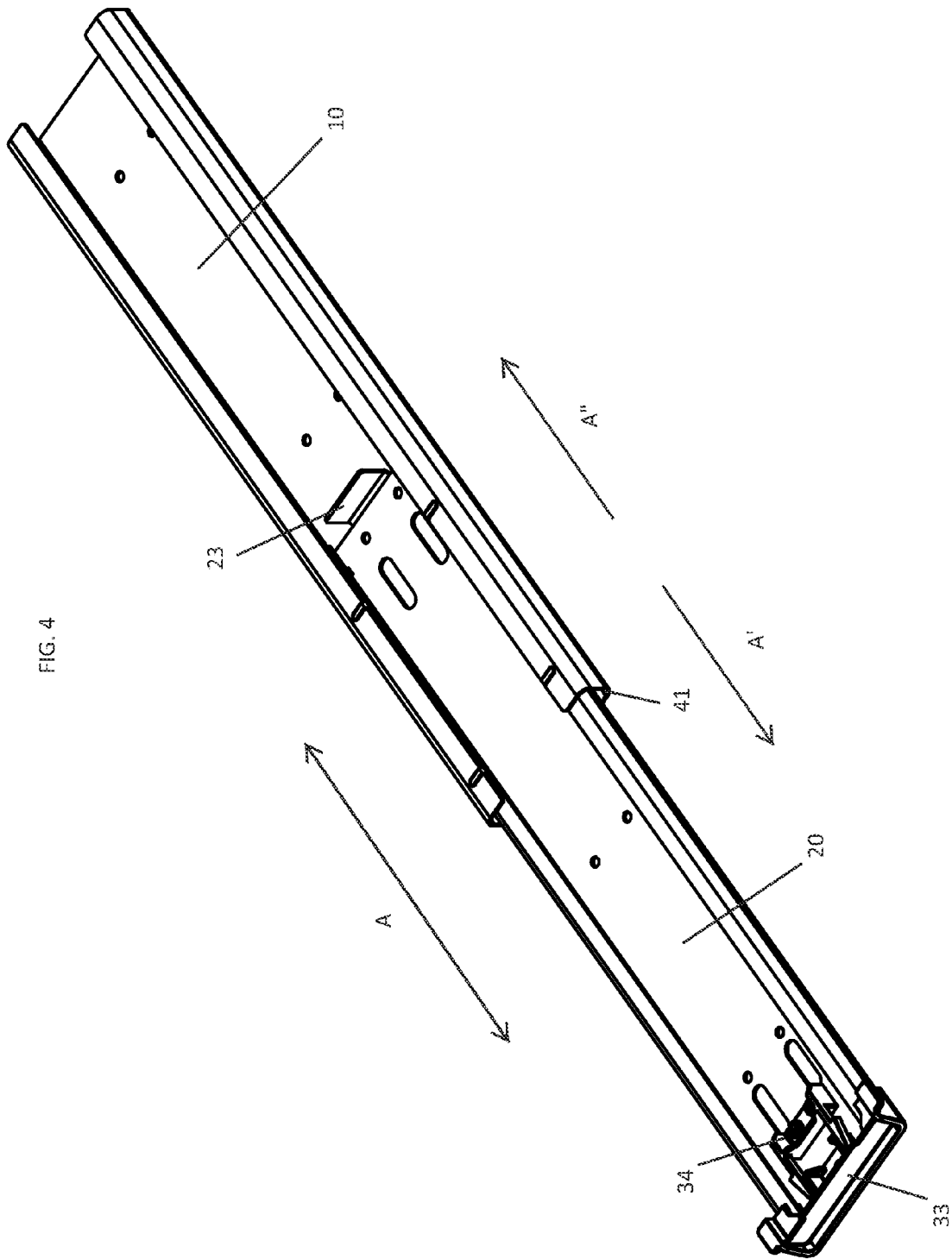
FIG. 4 is a perspective view of the assembly of the mounting track and the telescoping track.

FIG. 4 shows an assembled view of the mounting track 10 and telescoping track 20. The features of the mounting track 10, the telescoping track 20 and the assembly thereof 30 are shown with numerals corresponding to the numerals used in relation to FIGS. 1 through 3. The assembled view of FIG. 4 shows the telescoping track 20 in engagement with the mounting track 10. Stop member 23, end cap 33 and release member 34 are all shown disposed on telescoping track 20. It should be appreciated that FIG. 4 shows a bottom view of the assembly and that when the assembly is installed on the underside of a desk or similar surface, the features shown in FIG. 4 will be oriented in a downward direction, rather than in an upward direction as depicted in FIG. 4.

It should also be appreciated that telescoping track 20 is able to slidably translate in either direction along axis A marked in FIG. 4. Telescoping track 20 may translate in the direction A" shown in FIG. 4 and may slidably engage with the mounting track 10 to such an extent that telescoping track 20 is completely retained in mounting track 10. End cap 33 may act as a stop to prevent the telescoping track from further translation into the mounting track when end cap 33 makes contact with the front edge 41 of the mounting track 10. Other mechanisms for stopping further translation of the telescoping track into the mounting track will be readily apparent to those skilled in the art. When telescoping track 20 is moved completely in the direction A" and fully retained in the mounting track 10, telescoping track 20 is said to be in the inserted or retracted position. When the telescoping assembly is mounted on the underside of a desk or similar structure, and when telescoping track 20 is in the inserted or retracted position, telescoping track 20 is in a position in the area under the desk and does not substantially protrude past the edge of the desk.

Alternatively, telescoping track 20 may translate in the direction A' shown in FIG. 4. Telescoping track 20 may translate in the direction A' to such an extent that telescoping track runners make contact with the mounting track runners, as described in relation to FIG. 3. In such a case, telescoping track runners act as a stop to prevent telescoping track from further translation, and prevent telescoping track 20 from being pulled completely out of engagement with mounting track 10. Other mechanisms for stopping further translation of the telescoping track out of the mounting track will be readily apparent to those skilled in the art. When telescoping track 20 is moved as far in the direction A' as permitted by any stop mechanism, telescoping track 20 is said to be in the withdrawn or extended position. When the telescoping assembly is mounted on the underside of a desk or similar structure, and when telescoping track 20 is in the withdrawn or extended position, telescoping track 20 substantially protrudes past the edge of the desk or similar structure.

FIG. 5 shows an exploded view of a pivoting member 50 for use with the telescoping assembly. The pivoting member 50 comprises a track engagement member 51 and a CPU holder engagement member 52. Track engagement member 51 is sized and dimensioned to engage with the channel forming members of the telescoping track. CPU holder engagement member 52 is adapted to engage with a CPU holder. CPU holder engagement member 52 may engage with the CPU holder by way of fasteners 53 shown in FIG. 5 or by other fasteners or methods of fastening known in the art. The track engagement member 51 and CPU holder engagement member 52 are joined for 360° rotation about a vertical axis therethrough. More particularly, washer 55 may be disposed between track engagement member 51 and CPU holder engagement member 52 and then track engagement member 51 and CPU holder engagement member 52 may be joined by rivet 54 in such a way that track engagement member 51 and CPU holder engagement member 52 may rotate about the vertical axis therethrough. One of ordinary skill in the art will appreciate that any method of joining the track engagement member 51 and the CPU holder engagement member 52 may be employed as long as said method preserves the ability of those parts to rotate about their common vertical axis.

FIG. 6 shows a perspective view of the entire telescoping assembly 60 for a CPU holder, showing a CPU disposed therein. As shown in FIG. 6, mounting track 10 is fastened to the underside of generally horizontal surface 61. Generally horizontal surface 61 may be a desk, table or similar surface. Surface 61 is shown as transparent in FIG. 6 to facilitate the viewing of mounting track 10. Telescoping track 20 is engaged with mounting track 10, and is in the withdrawn or extended position. That is to say, telescoping track 20 is withdrawn as far forward as permitted by the stop mechanism formed by the cooperation of the mounting track runners and the telescoping track runners, as that mechanism was described in relation to FIG. 3. Pivoting member 50 is engaged with telescoping track 20, and is also engaged with CPU holder 62. CPU 63 is disposed within CPU holder 62. As can be seen in FIG. 6, the rear edge 63a of CPU 63 is past the edge 61a of generally horizontal surface 61. In this way, the telescoping assembly allows the user to withdraw the CPU from under a desk surface for easy access to all sides of the CPU. When access to the CPU is not needed, telescoping track 20 may be translated into mounting track 10 to position the CPU under the desk and out of the way of the user.

It will be appreciated by those of ordinary skill in the art that, while the forgoing disclosure has been set forth in connection with particular embodiments and examples, the disclosure is not intended to be necessarily so limited, and that numerous other embodiments, examples, uses, modifications and departures from the embodiments, examples and uses described herein are intended to be encompassed by the claims attached hereto. Various features of the disclosure are set forth in the following claims.

We claim:

1. A telescoping assembly for use with a CPU holder comprising:
   a mounting track provided with a plurality of mounting holes for securing the mounting track to the underside of a generally horizontal surface, said generally horizontal surface having an edge;
   a plurality of runners disposed in the mounting track;
   a telescoping track, adapted for insertion into the mounting track and to engage with the plurality of runners disposed therein, and having a proximate end and a distal end, said telescoping track further comprising a stop member at the distal end, a release member mounted on the telescoping track near the proximate end, and an end cap engaged with the proximate end of the telescoping track;
- a pivoting member, adapted for insertion into and engagement with the telescoping track, wherein said pivoting member is further adapted to engage with the CPU holder, said pivoting member comprising a track engagement member and a CPU holder engagement member, said track engagement member and said CPU holder engagement member joined for 360° rotation about a vertical axis therethrough; and
- wherein the telescoping track is adapted for translation along the mounting track from a retracted position to an extended position, and when the telescoping track is in the extended position, the pivoting member and the CPU holder are in a position substantially past the edge of the generally horizontal surface, and a CPU retained in the CPU holder is positioned past the edge of the generally horizontal surface.

2. The telescoping assembly for use with a CPU holder of claim 1 wherein the mounting track and the telescoping track have a generally C-shaped cross-section.

3. The telescoping assembly for use with a CPU holder of claim 1 wherein the end cap is removable.

4. The telescoping assembly for use with a CPU holder of claim 1 wherein the release member is adapted to retain the pivoting member in engagement with the telescoping track.

5. The telescoping assembly for use with a CPU holder of claim 4 wherein the release member is further adapted to release the pivoting member from engagement with the telescoping track upon compression by a user.

6. The telescoping assembly for use with a CPU holder of claim 1 wherein the mounting track and the telescoping track are formed from a material selected from the group consisting of steel, aluminum, other metals or plastics.

7. A telescoping assembly comprising:
- a mounting track provided with at least one mounting hole for securing the mounting track to the underside of a generally horizontal surface, said generally horizontal surface having an edge;
- at least one runner disposed in the mounting track;
- a telescoping track having a first end and second end, said telescoping track adapted for insertion into the mounting track and to engage with the at least one runner disposed therein;
- a pivoting member, adapted for insertion into and engagement with the telescoping track, wherein said pivoting member is further adapted to engage with a CPU holder and wherein the pivoting member further comprises a track engagement member and a CPU holder engagement member, said track engagement member and said CPU holder engagement member joined for 360° rotation about a vertical axis therethrough;
- wherein the telescoping track is adapted for translation along the mounting track from a retracted position to an extended position, and when the telescoping track is in the extended position, the pivoting member and the CPU holder are in a position substantially past the edge of the generally horizontal surface, and a CPU retained in the CPU holder is positioned past the edge of the generally horizontal surface;
- and wherein the telescoping track further comprises an end cap engaged with at least one end of the telescoping track.

8. The telescoping assembly of claim 7 wherein the telescoping track further comprising a stop member at the first end of the telescoping track.

9. The telescoping assembly of claim 7 wherein the telescoping track further comprises a release member mounted on telescoping track.

10. The telescoping assembly of claim 8 wherein the end cap is removable.

11. The telescoping assembly of claim 9 wherein the release member is adapted to retain the pivoting member in engagement with the telescoping track.

12. The telescoping assembly of claim 11 wherein the release member is further adapted to release the pivoting member from engagement with the telescoping track upon compression by a user.

13. The telescoping assembly of claim 7 wherein the mounting track and the telescoping track have a generally C-shaped cross-section.

14. The telescoping assembly of claim 7 wherein the mounting track and the telescoping track are formed from a material selected from the group consisting of steel, aluminum, other metals or plastics.

15. A telescoping assembly comprising:
- a mounting track provided with at least one mounting hole for securing the mounting track to the underside of a desk surface, said desk surface having an edge;
- a telescoping track, adapted for insertion into and engagement with the mounting track and having a proximate end and a distal end;
- a pivoting member, adapted for insertion into and engagement with the telescoping track, wherein said pivoting member is further adapted to engage with a CPU holder, said pivoting member comprising a track engagement member and a CPU holder engagement member, said track engagement member and said CPU holder engagement member joined for 360° rotation about a vertical axis therethrough;
- wherein said telescoping track further comprises a release member mounted on the telescoping track near the proximate end, said release member adapted to retain the pivoting member in engagement with the telescoping track and to release the pivoting member from engagement with the telescoping track upon compression by a user; and
- wherein the telescoping track is adapted for sliding translation along the mounting track from an inserted position to a withdrawn position,
- wherein when the telescoping track is in the inserted position, a CPU retained in the CPU holder is disposed in an area under the desk surface,
- wherein when the telescoping track is in the withdrawn position, the CPU retained in the CPU holder is entirely positioned past the edge of the desk surface;
- and wherein the telescoping track further comprises a removable end cap engaged with at least one end of the telescoping track.

16. The telescoping assembly of claim 15 wherein said telescoping track further comprising a stop member at the distal end.

17. The telescoping assembly of claim 15 wherein the mounting track and the telescoping track are formed from a material selected from the group consisting of steel, aluminum, other metals or plastics.

* * * * *